United States Patent
Van Den Bulcke

(10) Patent No.: US 6,196,101 B1
(45) Date of Patent: Mar. 6, 2001

(54) METHOD AND APPARATUS FOR MOVING WORKPIECES

(76) Inventor: Marc Van Den Bulcke, 892 Buchanan, Ville St. Laurent, Québec (CA), H4L 2V1

(*) Notice: Subject to any disclaimer, the term of this patent is extended or adjusted under 35 U.S.C. 154(b) by 0 days.

(21) Appl. No.: 09/303,754

(22) Filed: May 3, 1999

(51) Int. Cl.[7] ...................................... B26D 5/20
(52) U.S. Cl. ..................... 83/277; 83/412; 198/345.3; 198/867.14
(58) Field of Search ................. 83/412, 206, 277, 83/113, 121, 219, 270; 198/867.13, 867.14, 345.3, 750.11, 750.12, 750.13

(56) References Cited

U.S. PATENT DOCUMENTS

| | | | |
|---|---|---|---|
| 836,424 | * 11/1906 | Wilzin | 83/412 |
| 2,929,484 | * 3/1960 | Longdon | 198/345.3 |
| 3,161,145 | * 12/1964 | Cargill et al. | 198/867.14 |
| 3,646,656 | * 3/1972 | Zilahy et al. | 198/345.3 |
| 3,708,051 | * 1/1973 | Dato et al. | 198/345.3 |
| 4,523,749 | 6/1985 | Lindgren | |
| 4,790,427 | * 12/1988 | Dixon | 198/867.13 |
| 5,878,641 | * 3/1999 | Tsune | 83/277 |

FOREIGN PATENT DOCUMENTS

| | | |
|---|---|---|
| 0 663 262 A2 | 1/1995 | (EP) . |
| WO 92/12816 | 6/1992 | (WO) . |

* cited by examiner

Primary Examiner—M. Rachuba

(57) ABSTRACT

A workpiece moving machine comprising: an elongate frame with an endless belt mounted on the frame and extending between the ends of the frame. A plurality of trolleys are slidably mounted on the frame for movement along the frame. Each trolley has a clamp for selectively holding a workpiece to the trolley. A first clutch on each trolley selectively connects the trolley to one run of the belt to move the trolley along the frame in one direction and a second clutch on each trolley selectively connects the trolley to the other run of the belt to move the trolley along the frame in the opposite direction. A brake on each trolley selectively brakes the trolley to the frame to prevent its movement along the frame.

20 Claims, 6 Drawing Sheets

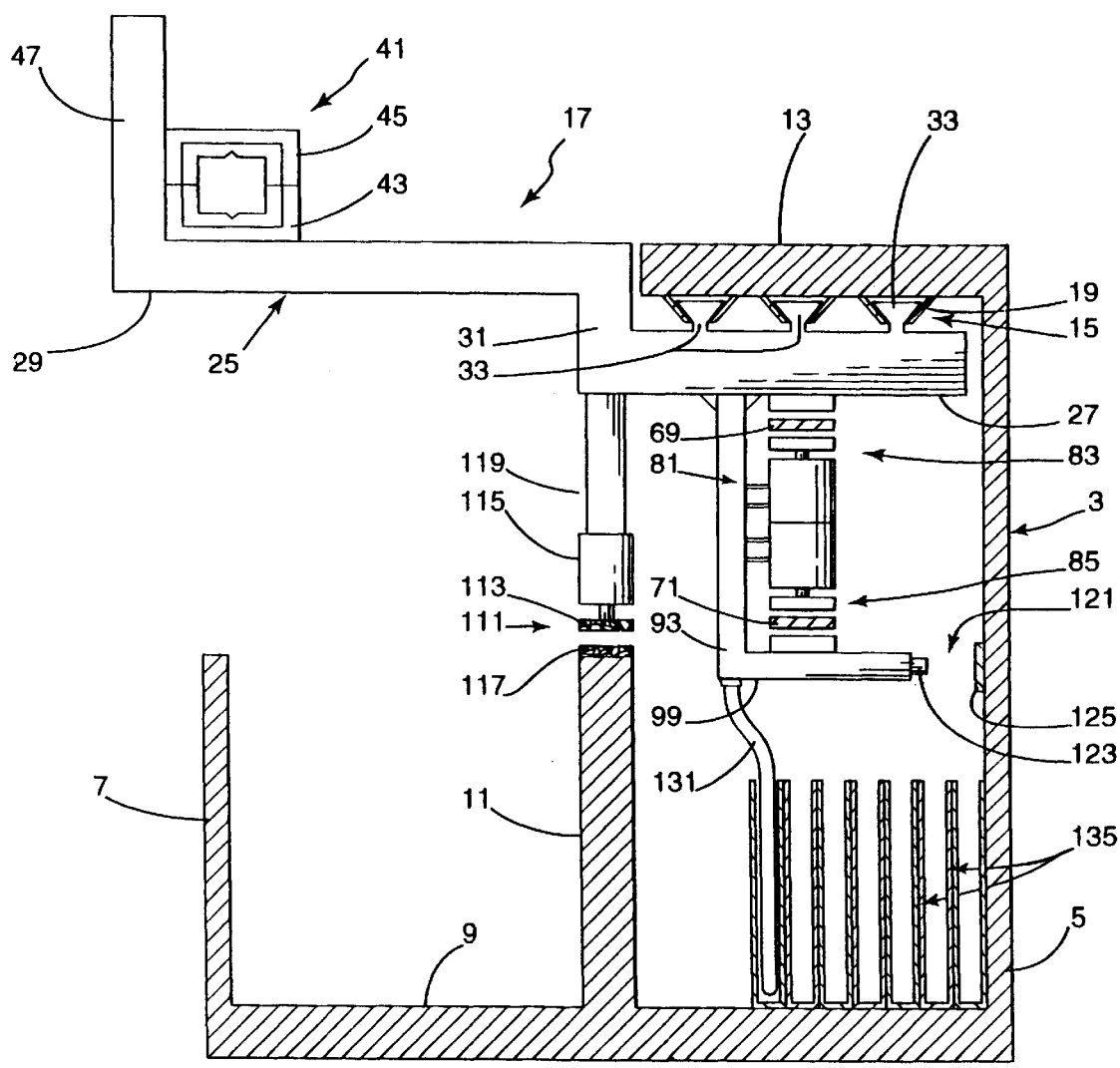
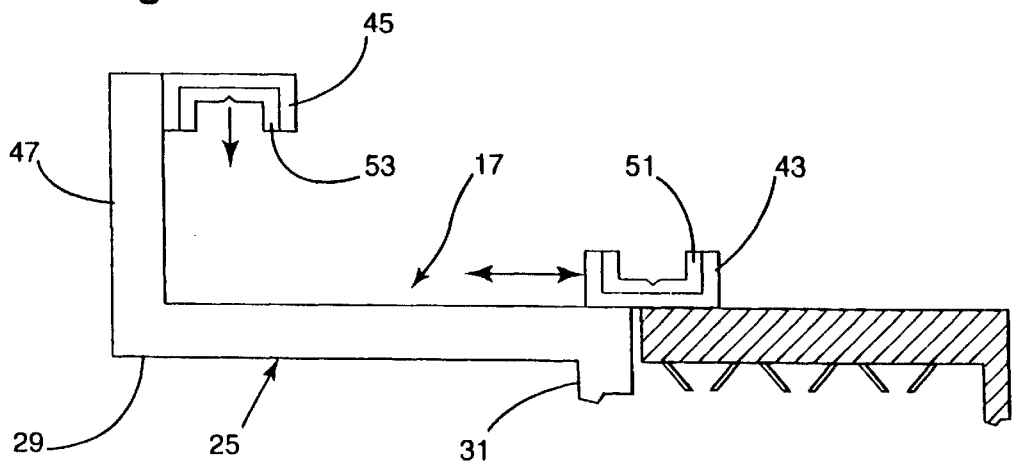
Fig. 3
Fig. 4

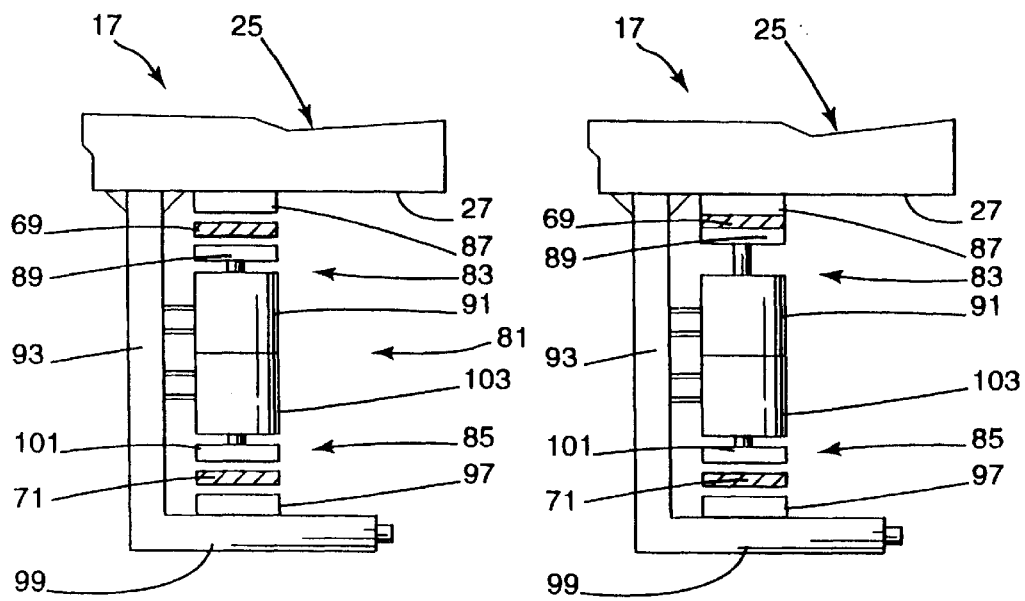
Fig. 5  Fig. 6
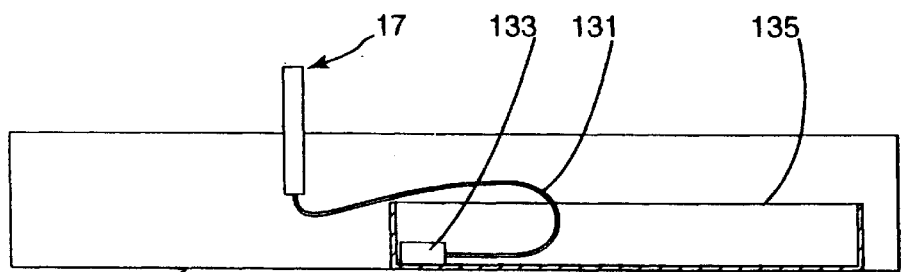
Fig. 7A
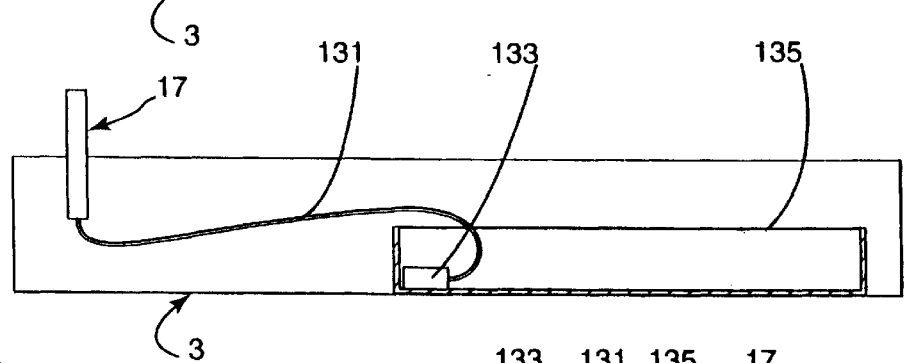
Fig. 7B
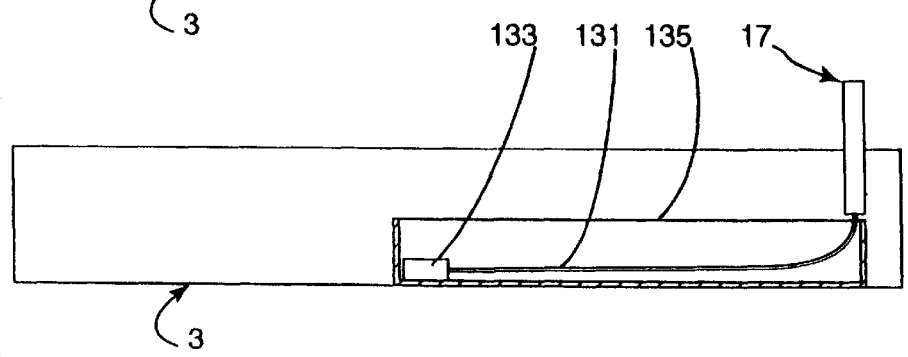
Fig. 7C

METHOD AND APPARATUS FOR MOVING WORKPIECES

BACKGROUND OF THE INVENTION

1. Field of the Invention

This invention is directed toward an improved method for moving workpieces and an apparatus for carrying out the method.

2. Description of the Related Art Including Information Disclosed Under CFR §§1.97–1.99

Machines are known for moving workpieces past one or more work stations so that one or more operations can be performed on the workpieces at the work stations. A typical example is a machine for feeding a profile (an extruded bar) past a work station where a cutting operation cuts profile pieces off the profile with the ends of the pieces cut at an angle. Some machines are also equipped with a second work station for performing a second operation on the profile pieces or with means for performing a second operation on the profile pieces at the first work station. The second operation could comprise a drilling operation for drilling holes in the profile pieces. The known machines however are relatively slow in operation. Most employ screw threads to move the workpieces. Further, the known machines handle workpieces in a manner which can damage their finish. Often the workpieces are dragged to position them, scrapping the finish in the process. The workpieces are also often clamped and unclamped repeatedly increasing the risk of nicks and dents. The known machines are also incapable of moving adjacent workpieces in opposite directions simultaneously without unclamping, repositioning and reclamping the workpieces which slows production.

SUMMARY OF THE INVENTION

It is the purpose of the present invention to provide an improved method and apparatus for moving workpieces, such as profiles, which is quicker than known machines. It is another purpose of the present invention to provide an improved method and apparatus for moving workpieces in a manner that maintains their finish. It is a further purpose of the present invention to provide a method and machine for quickly moving workpieces in either direction and more particularly for moving adjacent workpieces in opposite directions if required.

In accordance with the present invention there is provided a workpiece moving machine which has an elongated frame with a plurality of trolleys slidably mounted on the frame for movement along the frame. Each trolley has holding means for holding a workpiece. Usually a workpiece will be held by a number of the trolleys at spaced-apart locations along its length. An endless drive belt extends between the ends of the frame and clutch means on each trolley selectively connects the trolley to the belt to move the trolley along the frame. Each trolley has brake means for holding the trolley stationary when not connected to the belt. Each trolley can be selectively connected to either run of the belt which allows each trolley to be moved in either direction.

The machine, using the belt, allows rapid positioning of the workpiece in either direction and also allows two adjacent workpieces to move in opposite directions if desired. The trolleys grip the workpiece until all operations to be performed on the workpiece are finished thus ensuring that the workpieces are not damaged by excessive handling.

By way of example, the machine of the present invention can be used to move an extrusion bar or profile by first holding or gripping the profile at spaced-apart longitudinal locations with a number of trolleys. The gripped profile is then moved by clutching the first or lead trolley to one run of the moving belt. The other trolleys gripping the profile could be clutched to the belt at the same time, or they could be left unclutched and unbraked moving through movement of the profile by the first or lead trolley. The profile can be moved to a work station where it is stopped and a profile piece is cut off the profile. The profile is positioned at the work station so that the profile piece cut off is still gripped by at least one trolley. The cut-off profile piece, without being released from the trolley, can be moved, using the belt, to another work station along the machine for further operations or to a location where it can be unloaded. Alternatively, the profile piece and the profile can be moved in opposite directions at a work station to have simultaneous operations performed on their adjacent ends. This is easily accomplished by having the trolleys gripping the profile piece clutch one run of the belt and the trolleys gripping the profile clutch the other run of the belt so the profile and profile piece are moved apart the required distance. At the required distance, the trolleys are braked and an operation is performed simultaneously on the adjacent ends of the profile and profile piece. The profile pieces are each gripped by at least one trolley at all times. Thus all the workpieces are always gripped by trolleys until the workpieces are to be unloaded. Since the workpieces do not undergo handling after loading the workpieces on the trolleys, they are not damaged.

The invention is particularly directed toward a workpiece moving machine comprising an elongate frame and a plurality of trolleys slidably mounted on the frame for movement along the frame. Holding means on each trolley hold a workpiece to the trolley. Moving means are mounted on the frame and extend between the ends of the frame. Clutch means on each trolley selectively connect the trolley to the moving means to move the trolley along the frame. Brake means on each trolley selectively brake the trolley to the frame to prevent its movement along the frame.

The invention is also directed toward a method of moving a workpiece comprising: providing a plurality of trolleys slidable along an elongate frame and providing moving means in the form of an endless belt along the frame with first and second belt runs movable in opposite directions. The workpiece is held by a number of the trolleys at selected spaced-apart locations on its length to provide a work unit. At least one of the trolleys in the work unit is selectively connected to the first or second belt run to move the work unit, including the held workpiece, in one direction or the other.

BRIEF DESCRIPTION OF THE DRAWINGS

FIG. 3 is cross section view of the machine, taken along line 3—3 in FIG. 1, with the workpiece clamp on the trolley in a closed position;

FIG. 4 is a detail view of the trolley with the workpiece clamp open;

FIG. 5 is a detail side view of the clutch and brake means on the trolley with both inoperative;

FIG. 6 is a view similar to FIG. 5 showing the clutch means operative;

FIGS. 7A to 7C are schematic views of the machine showing the movement of a power line connected to a trolley

DESCRIPTION OF THE PREFERRED EMBODIMENTS

Figure 1:
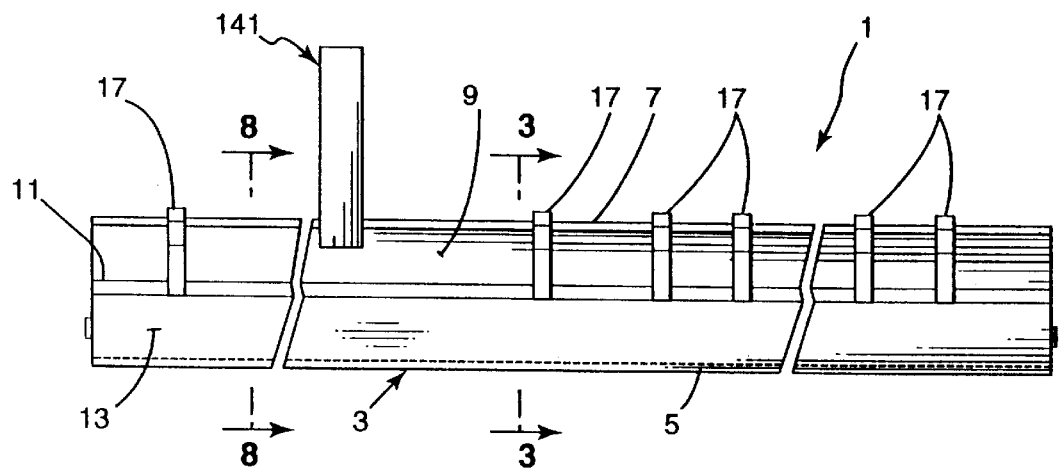
FIG. 1 is plan view of the machine.
Figure 2:
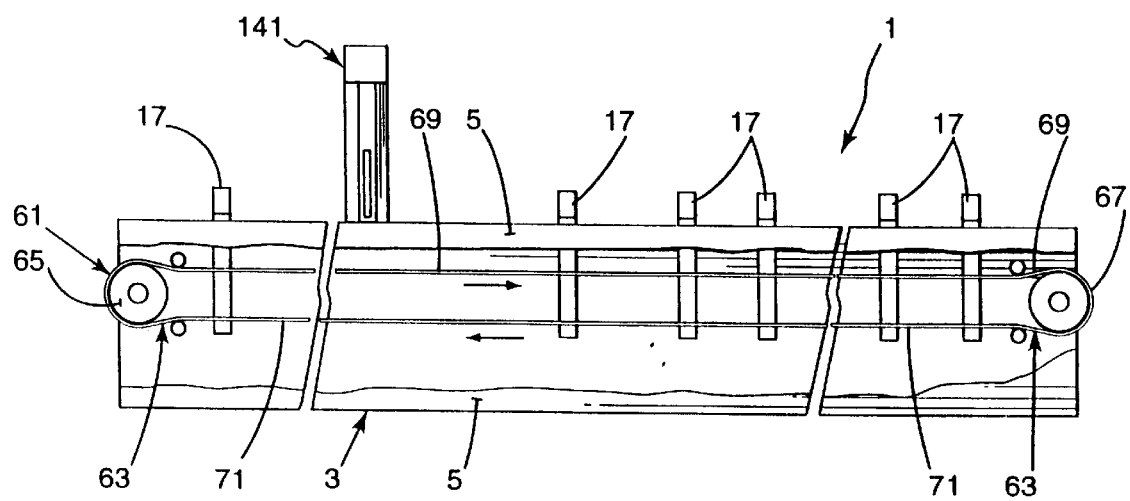
FIG. 2 plan elevation view of the machine, partly broken away.

The machine 1 of the present invention, as shown in FIGS. 1 to 3, has an elongated main frame 3. The frame has a front wall 5, a short rear wall 7 and a bottom wall 9 joining the front and rear walls 5 and 7. There is a short intermediate wall 11 between the front and rear walls 5, 7 extending upwardly from the bottom wall 9. A top wall 13 extends rearwardly from the top of the front wall 5. The "walls" 5, 7, 9 and 11 can be defined by open frameworks.

Guide means 15 are provided on the main frame 3 for guiding the movement of trolleys 17 as will be described. The guide means 15 can comprise at least two, and preferably three, parallel rails 19 mounted under the top wall 13 of the main frame 3. The rails extend the length of the main frame 3 and are equally spaced apart.

A plurality of trolleys 17 are mounted for sliding movement on the rails 19. The trolleys are identical so only one will be described in detail. The trolley 17 has a trolley frame 25 with a short, horizontal, front arm 27 and a longer, horizontal, rear arm 29 which is vertically offset from the front arm 27 to be above it. A short vertical arm 31 joins the back of the front arm 27 to the front of the back arm 29. There are three sliders 33 mounted on top of the front arm 27. The sliders 33 slide in the rails 19, the rails 19 supporting the trolley frame 25 via the sliders 33. Each trolley 17 is free to slide longitudinally along the rails 19 while being supported therefrom.

Each trolley 17 carries holding means in the form of clamp means 41 for clamping at least one workpiece to the trolley. Each clamp means 41 comprises a bottom clamp 43 that is mounted for sliding movement along the top of the rear arm 29 of the trolley frame 25. The bottom clamp 43 is movable between a loading position at the front of the rear arm 29, as shown in FIG. 4, and a clamping position at the rear of the rear arm as shown in FIG. 3. Suitable motor and drive means on the rear arm (not shown) move the bottom clamp 43 between the loading and clamping positions. The clamp means 41 has a top clamp 45 that is mounted for sliding movement on a vertical support 47 at the end of the rear arm 29. The top clamp 45 is movable between a top, unclamped position, as shown in FIG. 4, and a bottom clamping position, shown in FIG. 3, where it abuts the bottom clamp 43 when the bottom clamp is in the clamping position. Pneumatic means (not shown) on the vertical support 47, or on the tear of the rear arm 29, move the top clamp 45 between the unclamped and clamped positions. A bottom form 51 can be detachably mounted on top of the bottom clamp 43 for holding the bottom half of at least one workpiece. A top form 53 is detachably mounted on the bottom of the top clamp 45 for holding the top half of a workpiece when the top clamp 45 abuts the bottom clamp 43 in the clamping position. The top and bottom forms 51, 53 are shaped to match the cross-sectional shape of the workpiece to be held. The forms can be quickly and easily replaced by other forms to match the cross-sectional shape of other workpieces. The forms 51, 53 can be shaped to hold more than one workpiece at a time. Since the rear arms 29 of the trolleys 17 extend rearwardly of the front of the main frame 3, the clamp means 41, in the clamping position, will hold the workpiece in cantilevered fashion above and to the rear of the main frame 3. This allows access to the workpiece from all sides without interfering with the main frame 3 of the machine.

Moving means 61 are mounted on the main frame 3 for moving the trolleys 17 along the frame. The moving means 61, shown in FIG. 2, preferably comprises an endless belt 63 mounted over a drive pulley 65 at one end of the main frame and a driven pulley 67 mounted at the other end of the main frame 3. A suitable motor (not shown) rotates the drive pulley 65 to drive the belt 63 about both pulleys with the upper run 69 of the belt 63 moving in one direction, parallel to the top of the main frame 3, and the lower run 71 of the belt moving in the opposite direction. The belt runs 69, 71 are horizontal and parallel to each other, but vertically spaced apart. The belt runs 69, 71 pass through each trolley 17, as shown in FIG. 3, underneath the front arm 27 of its frame 25.

Clutch means 81 are provided on each trolley 17 for gripping the belt 63, and more specifically, for gripping either the top or bottom run 69, 71 of the belt to move the trolley 17 in either direction when the belt is moved. The clutch means 81, as shown in FIGS. 3 and 5, comprises upper and lower clutches 83, 85. The upper clutch 83 has a first, upper clutch pad 87 fastened to the bottom of the front arm 27 of the trolley. A first, lower clutch pad 89 is fastened to the upper end of a piston rod on a pneumatic cylinder 91 which is fixed to the side of a vertical support arm 93 extending down from the front arm 27. The first, upper clutch pad 87 is normally spaced from the first, lower clutch pad 89 and the upper belt run 69 normally passes freely between them. The lower clutch 85 is similar to the upper clutch 83 and has a second, bottom clutch pad 97 fastened to the top of a bottom support arm 99 extending horizontally from the bottom end of the vertical support arm 93. A second, upper clutch pad 101 is fastened to the bottom end of a piston rod on a pneumatic cylinder 103 which is fixed to the side of the vertical support arm 93 adjacent to the other pneumatic cylinder 91. The second, lower clutch pad 97 is normally spaced from the second, upper clutch pad 101 and the lower run 71 of the belt 63 passes freely between them. When the upper clutch 83 is operated, as shown in FIG. 6, it clamps the upper run 69 of the belt tight against the trolley frame 25 between the first clutch pads 87, 89 to move the trolley 17 in one direction. When the lower clutch 85 is operated, it clamps the lower run 71 of the belt tight against the trolley frame 25 between the second clutch pads 97, 101 to move the trolley 17 in the opposite direction.

Brake means 111 are provided on each trolley 17 for braking the trolley 17 against the frame 3 so the trolley cannot move. The brake means 111, as shown in FIG. 3, can comprise a brake pad 113 moved by a pneumatic cylinder 115 to press against a brake surface 117 on the top of the intermediate bottom wall 11 of the main frame 3. The brake pad 113 and cylinder 115 is mounted beneath the short vertical connecting section 31 of the trolley frame 25 on the end of a second support post 119. When the trolley 17 is declutched from the belt 63, the brake means 111 can be operated to hold the trolley stationary on the main frame 3. The brake means 111 are inoperative when the clutch means 81 are operative.

Each trolley 17 has position locating means for locating its position on the main frame 3. The position locating means 121, as shown in FIG. 3, can comprise an optical or magnetic sensor 123 mounted on the trolley frame 27 in a position to read an optical or magnetic strip 125 mounted on the main frame 3 along its length.

Each trolley 17 is connected to a power source by a power line 131 which brings both electrical power and air or hydraulic power to each trolley to operate the various motors or moving means on the trolley associated with the clamps, the clutches and the brake. The power lines 131 will also carry data communication cables. These data cables can be in the form of a high speed data bus (either twisted wire pairs or fiber optics). The data transmitted by the cables controls the operation of the various motors and moving means on each trolley. Each power line 131 is connected to a power and data communication source 133 at about the bottom, center of the main frame 3 as shown in FIG. 7A. The power lines 131 are side by side, each mounted in a narrow sleeve 135 to minimize interference between the lines. Each sleeve 135, open at the top, guides each line 131 in a loop so the line can reach either end of the main frame 3 as the trolley 17 moves along the main frame between its ends trailing its power line behind it as shown in FIGS. 7B and 7C. The sleeves 135 are fixed and located side-by-side on the lower front of the main frame 3 adjacent the front wall 5 and on the bottom wall 9 as shown in FIG. 3.

Figure 8:
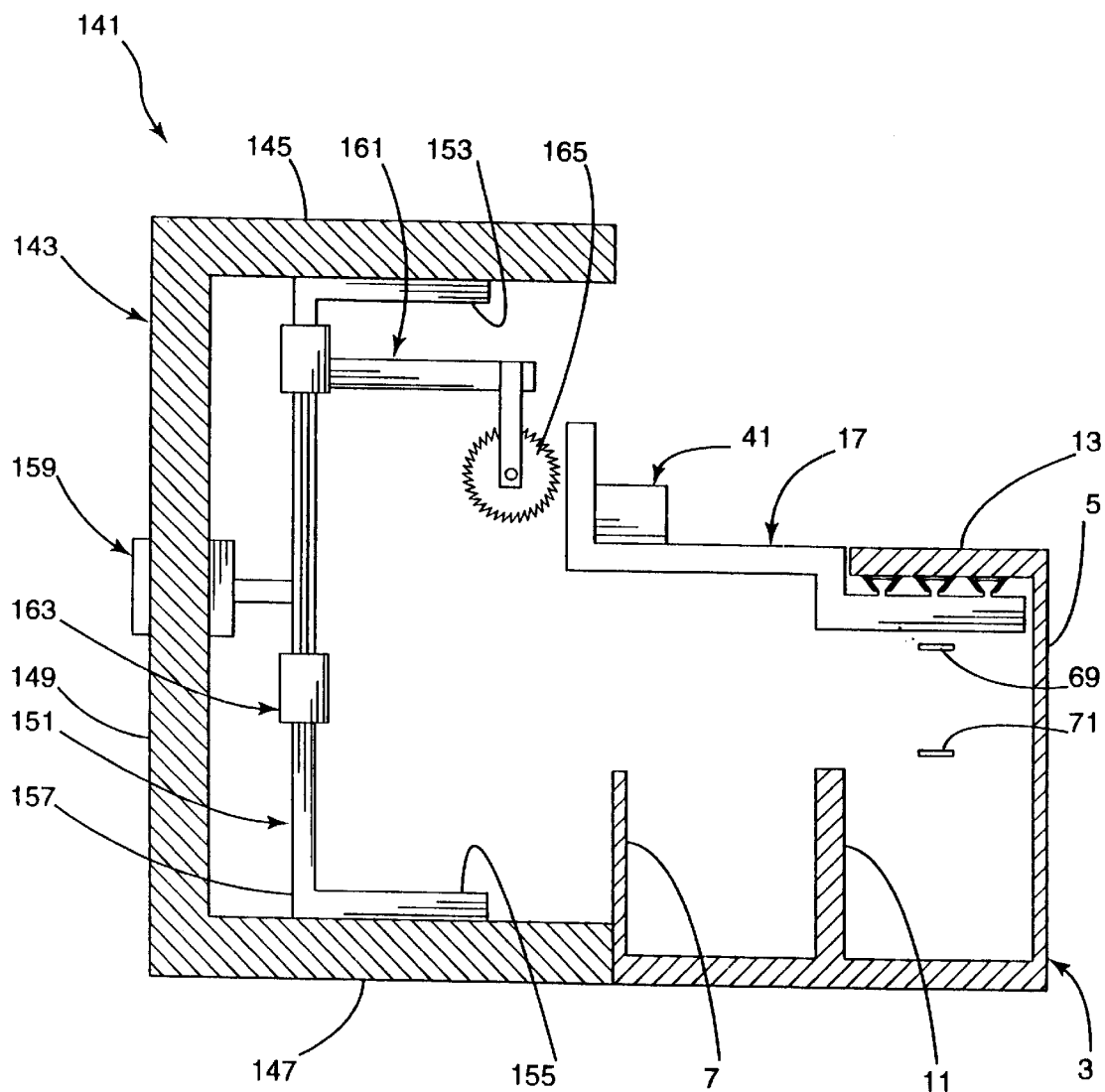
FIG. 8 is a cross-section view, taken along line 8—8 in FIG. 1, of a work station the machine.

The machine 1 is normally used to move a workpiece to at least one work station 141. The work station 141 is located adjacent the machine 1 and can be fastened to the main frame 3 at the bottom. Usually the work station 141 is intermediate the ends of the main frame 3. As shown in FIG. 8, the work station 141 can comprise a C-shaped base frame 143, having a top horizontal frame member 145 and a bottom horizontal frame member 147 joined by a vertical frame member 149. The base frame 143 can be fixed at the bottom to the rear wall 7 of the main frame 3 and is located on one side of it. Mounted in the base frame 143 is a tool frame 151 having top and bottom arms 153, 155 slidable in the top and bottom frame members 145, 147. The top and bottom arms 153, 155 are joined by a vertical arm 157. Suitable moving means 159 mounted on the base frame 143 move the tool frame 151 horizontally relative to the base frame 143. A carriage 161 is slidably mounted on the vertical arm 157 of the tool frame 151. Suitable moving means 163 mounted on the tool frame 151 moves the carriage 161 up and down relative to the vertical arm 157. The carriage 161 carries a saw 165 mounted on the carriage 161 in such a way that angle of the saw to a vertical plane can be changed by suitable moving means (not shown). The saw 165 is movable toward the main frame 3 between the rear arms 29 of the trolley frames 25 to cut through a workpiece held by the clamp means 41 on the trolleys 17, the clamp means 41 holding the workpiece in cantilever fashion.

In use, the trolleys 17 are positioned at one end of the frame 3 to receive a work piece. It is determined in advance how many trolleys 17 are required to support a workpiece for the operations required on the workpiece and where the trolleys are to be located on the frame 3. The required number of trolleys are then positioned on the frame, using the positioning means 121, at one end, braked to maintain their position, and their clamp means 41 are opened to receive the workpiece. The lower clamp 43 on each trolley 17 is moved forwardly, after the upper clamp 45 has been raised, and the workpiece is placed in all the lower clamps 43 of all the required trolleys. The lower clamps 43 are then simultaneously moved back on all the trolleys and the upper clamps 45 are lowered to clamp the workpiece in the clamp means on each selected trolley.

Figure 9A:
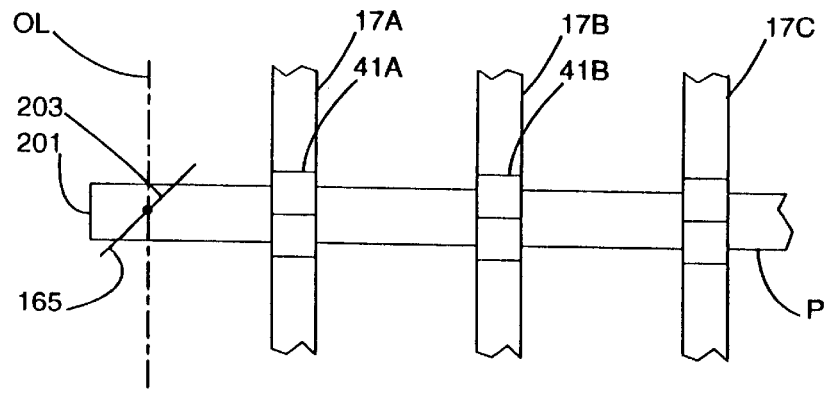
FIGS. 9 to show a partial sequence of operations using the machine in one mode.
Figure 9B:
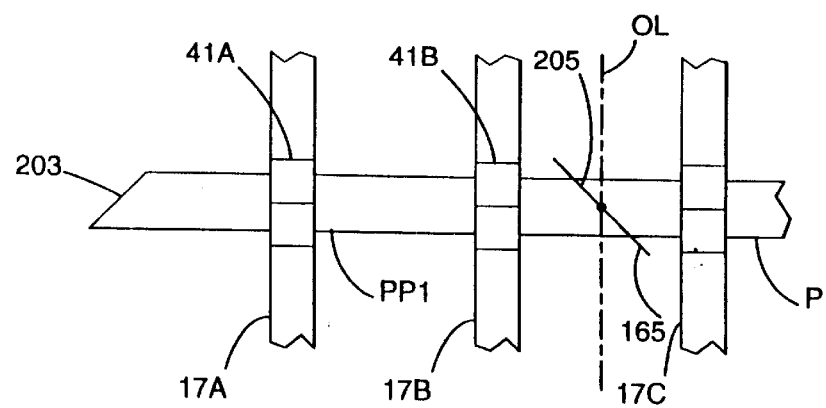
Figure 9C:
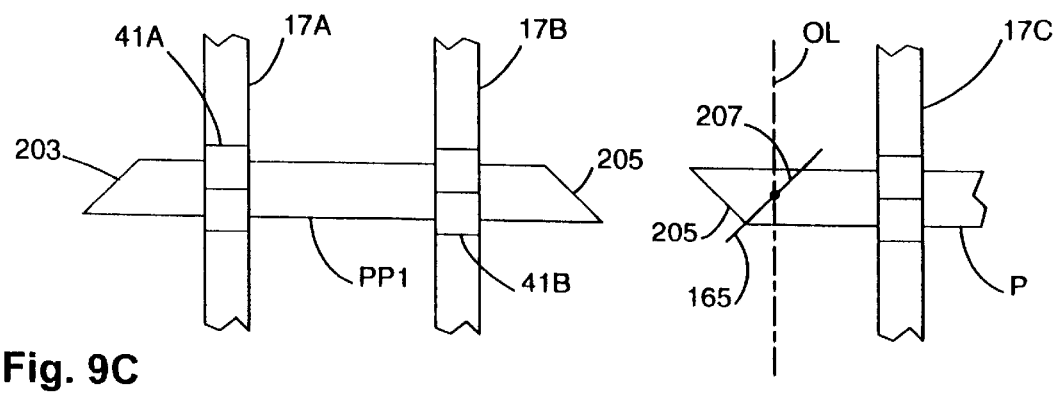
Figure 9D:
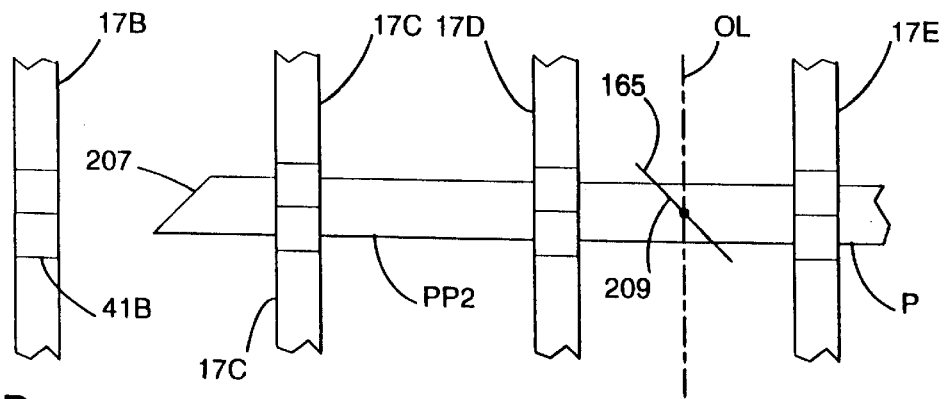

By way of example only, to illustrate the operation of the moving means, assume the workpiece loaded into the trolleys 17 is a profile that is to be cut into pieces. The profile P is loaded onto the required number of trolleys with the trolleys positioned so as to have each piece that is cutoff supported by two trolleys and to have each cut made between two closely adjacent trolleys. Once the profile has been loaded in the trolleys, the trolleys are clutched to the upper run 69 of the belt 63, the brakes 111 released, and the belt 63 run to move the work unit, consisting of clutched trolleys and clamped profile, to a first position in the work station. At this first position, locating the leading end 201 of the profile P adjacent the datum line DL of the saw 165 where the first cut is to be made, as shown in FIG. 9A, the belt is stopped, the trolleys are unclutched from the belt 63 and braked to the main frame 3 by the brake means 111. The first cut 203 by the saw 165 cuts the leading end 201 of the stationary profile P at a 45° angle right at the saw datum line DL and adjacent the first trolley 17A. The trolleys 17 are then again clutched to the upper run of the belt while simultaneously unbraked from the main frame 3, the belt is run, and the entire work unit of trolleys 17 and clamped profile P, moves forwardly again a predetermined distance to a second position which locates the DL between the second and third trolleys 17B, 17C at a location on the profile P defining the length of the first profile piece PP1 to be cut off as shown in FIG. 9B. The belt is stopped and trolleys 17 are declutched and braked at the second position. A second saw cut 205 between the second and third trolleys 17B, 17C now cuts the first profile piece PP1 off the profile P, the second saw cut being at a 45° angle left. The first and second trolleys 17A, 17B, holding the first profile piece PP1, are then debraked and clutched to the belt 63 and the belt moved to move the first profile piece PP1 to an unloading station as shown in FIG. 9C. At the unloading station, the clamps 41A, 41B on the trolleys 17A, 17B are opened, and the profile piece PP1 is removed. The first and second trolleys 17A, 17B are then moved to the far left of the main frame 3 for storage. Meanwhile the profile P is moved by clutching the third trolley 17C and the remaining trolleys to the belt to move the profile a short distance to the datum line DL so that a third cut 207 can made on the profile P at the datum line DL at an angle 45° right adjacent the third trolley 17C as shown in FIG. 9C. The third and remaining trolleys are then moved to move the profile P to a third position locating the DL between the fourth and fifth trolleys 17D, 17E at a location on the profile defining the length of the second profile piece PP2 to be cut off. The remaining trolleys are again declutched and braked and a fourth cut 209 is made by the saw at an angle 45° left separating the second profile piece PP2 from the profile P. The third and fourth trolleys 17C, 17D move the second profile piece PP2 to the unloading station. The steps are repeated until all the profiles pieces are cut. Throughout this process, the trolleys are clutched to, or declutched from, the upper run of the belt. The belt is only run after the trolleys are clutched to the belt. Unclutching of the trolleys, and braking, occurs only when the belt is stopped. Any scrap that falls down from the cutting operations can be collected on a conveyor (not shown) mounted on the bottom wall 9 of the main frame 3 adjacent the rear wall 7.

While the all the trolleys 17 clamping the profile have been said to be simultaneously clutched/declutched and braked/unbraked to move or lock them, they could also be moved or locked by operating only the lead trolleys on each piece. Thus when the profile is initially moved from the loading station to the work station only the lead trolley need be clutched to the upper run of the belt. The clutch and brake means on the other trolleys would be inoperative and these trolleys are moved by the being clamped to the profile which is moved by the first trolley. After separating the profile piece from the profile, only the lead trolleys on both the profile and profile piece need be operated to move the units.

It will be seen that the profile and profile pieces are continually held by the trolleys from the start of the operation to the finish of unloading of the profile pieces. Thus none of the pieces are free to slide relative to the clamp or gripping means which could damage the finish on the pieces.

Figure 10A:
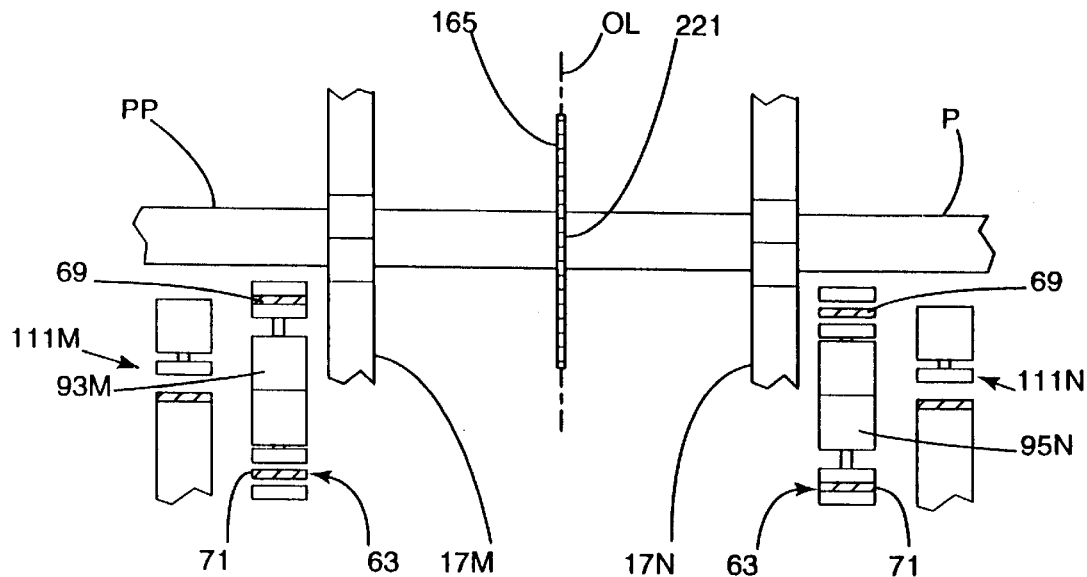
FIGS. 10A and 10B show a partial sequence of operations using the machine in another mode.
Figure 10B:
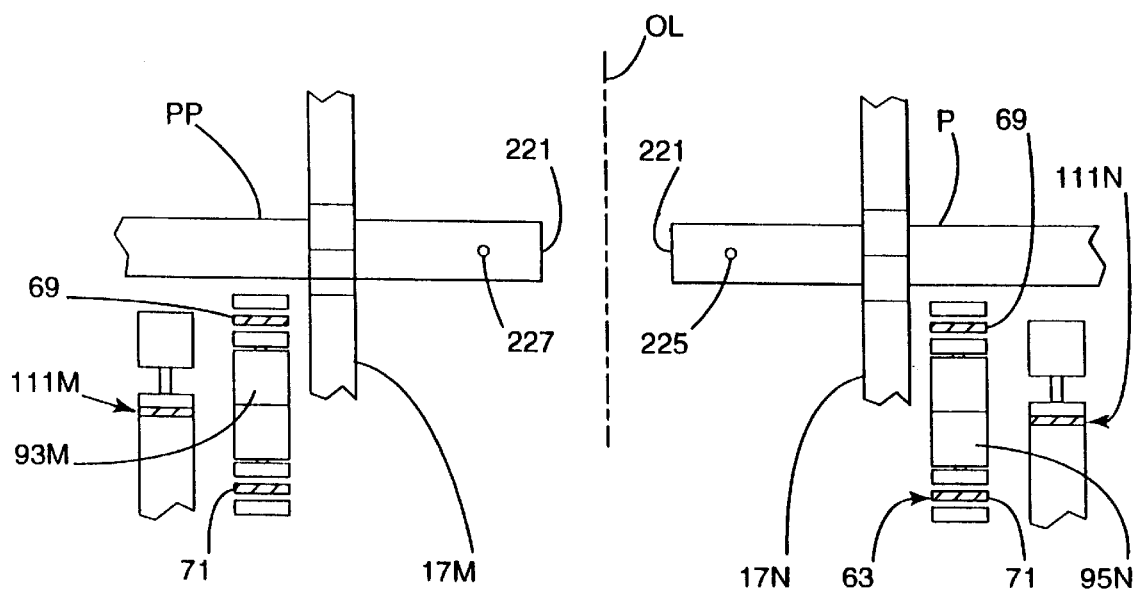

While a saw has been shown at the work station, other operations could also be performed at the work station in place of cutting, such as drilling or punching. Also, more than one work station could be set up along the machine, there being one work station for sawing and one for drilling for example. In some operations such as drilling, the profile and profile piece, after cutting, could be moved in opposite directions simultaneously the same distance apart from the central datum line DL. After moving, the profile and profile piece could be drilled separately or simultaneously. The moving is easily accomplished by clutching the leading trolley 17M adjacent the cut 221, as shown in FIG. 10A, to the upper run 69 of the belt 63 by the top clutch 93M and by simultaneously clutching the trailing trolley 17N adjacent the cut 221 to the lower run 71 of the belt 63 by its bottom clutch 95N which lower run runs in the opposite direction to the top run. When the belt 63 is then moved both the profile P and profile piece PP are moved the same distance apart from the datum line DL in opposite directions until the position for drilling them has been reached at which time the belt is stopped and both trolleys 17M, 17N are simultaneously declutched and braked by the brake means 111M, 111N as shown in FIG. 10B. Once the profile and profile piece have been moved apart, the adjacent ends of the pieces can be drilled as shown by drill holes 225, 227.

The machine allows the profile and the profile piece to be moved in one of the following manners:
  a) separately in the same direction, by sequentially connecting the profile and profile piece, via at least one trolley on each, to the same run of the belt;
  b) together in the same direction, by simultaneously connecting the profile and profile piece, via at least one trolley on each, to the same run of belt;
  c) separately in opposite directions, by sequentially connecting the profile, via at least one trolley, to one run of the belt, and by connecting the profile piece, via at least one trolley, to the other run of the belt; and
  c) together in opposite directions, by simultaneously connecting the profile via at least one trolley to one run of belt and by connecting the profile piece via at least one trolley, to the other run of belt.

The machine is run by a Programmable Logic Controller (PLC) which is commanded by a user-interface program running on an ordinary computer. The PLC communicates through the data cables in the power lines 131 with input/output (I/O) modules. The I/O modules may be mounted on each trolley. In this case, all switches and valves associated with the various motors and the position detector are connected to the I/O module on each trolley. Alternatively, the I/O modules can be centrally located, off the trolleys, on the machine. Then each trolley has a multiconductor cable running through its power line 131 to connect each I/O module to the switches, valves and position detector on each trolley. The motor driving the belt 63 is controlled by a servo controller using information from the position detectors on the trolleys. The servo controller receives its instructions from the PLC via an I/O module. Preferably, the only electrical motor on the trolley is a stepper motor used to control the bottom clamp 43 of the clamp means 41. The clutches, brake and top clamp are preferably operated by simple pneumatic valves, which receive an electrical signal through an I/O module, the valves controlling operation of pneumatic cylinders.

I claim:

1. A workpiece moving machine comprising: an elongate frame, the frame having spaced apart ends and defining a straight pathway between the ends; moving means mounted on the frame and extending between the ends of the frame; a plurality of trolleys slidably mounted on the frame for movement on the frame along the pathway; each trolley having holding means for selectively holding a workpiece to the trolley; clutch means on each trolley for selectively connecting the trolley to the moving means to move the trolley along the frame; and brake means on each trolley for selectively braking the trolley to the frame to prevent its movement along the frame.

2. A moving machine as claimed in claim 1 wherein the moving means comprises an endless belt mounted over a drive pulley at one end of the frame and a driven pulley at the other end of the frame, motor means for selectively operating the drive pulley, the belt having first and second belt runs extending along the frame, the runs moving in opposite directions.

3. A moving machine as claimed in claim 2 wherein the clutch means on each trolley comprises a first clutch to selectively clutch the trolley to the first belt run to move the trolley in one direction along the frame and a second clutch to selectively clutch the trolley to the second belt run to move the trolley in the other direction along the frame.

4. A moving machine as claimed in claim 3 including at least one work station adjacent the frame intermediate its ends, the work station having tool for performing an operation on a workpiece when it is moved to, and held stationary at, the work station by at least some of the trolleys.

5. A moving machine as claimed in claim 4 wherein the work tool comprises a saw for cutting through the workpiece held at the work station to divide it into two pieces, each piece still held by at least one trolley after the cut is made, each piece movable by selectively clutching at least one trolley on the piece to the belt.

6. A moving machine as claimed in claim 5 wherein the two pieces can be moved simultaneously by the moving means in opposite directions by having at least one of the trolleys holding the one piece clutch onto one belt run and at least one of the trolleys holding the other piece clutch onto the other belt run.

7. A moving machine as claimed in claim 3 wherein each trolley has a frame with an extension extending rearwardly, the holding means located at the rear of the extension in a holding position to hold the workpiece in cantilever fashion at the rear of the trolley.

8. A moving machine as claimed in claim 3 wherein the holding means comprise two mating clamps, each clamp having a replaceable form, the forms conforming to the cross-sectional shape of the workpiece to be held.

9. A moving machine as claimed in claim 7 wherein the holding means comprise two mating clamps, each clamp having a replaceable form, the forms conforming to the cross-sectional shape of the workpiece to be held.

10. A moving machine as claimed in claim 4 wherein each trolley has a frame with an extension extending rearwardly, the holding means located at the rear of the extension in a holding position to hold the workpiece in cantilever fashion at the rear of the trolley and within the work station.

11. A moving machine as claimed in claim 4 wherein the holding means comprise two mating clamps, each clamp having a replaceable form, the forms conforming to the cross-sectional shape of the workpiece to be held.

12. A moving machine as claimed in claim 10 wherein the holding means comprise two mating clamps, each clamp having a replaceable form, the forms conforming to the cross-sectional shape of the workpiece to be held.

13. A moving machine as claimed in claim 5 wherein each trolley has a frame with an extension extending rearwardly, the holding means located at the rear of the extension in a holding position to hold the workpiece in cantilever fashion at the rear of the trolley and within t he work station.

14. A moving machine as claimed in claim 5 wherein the holding means comprise two mating clamps, each clamp having a replaceable form, the forms conforming to the cross-sectional shape of the workpiece to be held.

15. A moving machine as claimed in claim 13 wherein the holding means comprise two mating clamps, each clamp having a replaceable form, the forms conforming to the cross-sectional shape of the workpiece to be held.

16. A method of moving a workpiece with an apparatus having a plurality of trolleys slidable along an elongate frame, each trolley having workpiece holding means, and the apparatus having moving means along the length of the frame; the method comprising: placing at least some of the trolleys at selected spaced-apart locations on the frame, holding the workpiece on the trolleys at the selected locations with the workpiece holding means so as to form a work unit comprising the trolleys at the selected locations and the workpiece; and then selectively connecting at least one of the trolleys in the work unit to the moving means to move the work unit, including the held workpiece, in one direction along the frame.

17. A method as claimed in claim 16 wherein the moving means comprises an endless belt having first and second runs, and operating means selectively moving the belt to move the runs in opposite directions along the frame; and selectively connecting at least one of the trolleys on the work unit to either belt run to move the work unit in either direction when the belt is moved.

18. A method as claimed in 17 including moving the work unit to a cutting station along the frame; stopping the belt; braking the work unit at the cutting station by braking the trolleys to the frame; cutting the workpiece on the work unit into two pieces at the cutting station with each piece still held by at least one trolley; and moving each piece by selectively connecting at least one trolley on each piece to the belt, unbraking the trolleys on each piece, and moving the belt.

19. A method as claimed in claim 18 wherein the two pieces are moved simultaneously in opposite directions away from each other, to provide access to their adjacent cut surfaces, by having at least one trolley on one piece selectively connect to the first run of the belt and having at least one trolley on the other piece selectively connect to the second run of the belt.

20. A method as claimed in claim 18 wherein the two pieces are moved in one of the following manners:
   a) separately in the same direction, by sequentially connecting each piece, via at least one trolley, to the same run of the belt;
   b) together in the same direction, by simultaneously connecting each piece, via at least one trolley, to the same run of belt;
   c) separately in opposite directions, by sequentially connecting one piece, via at least one trolley, to one run of the belt, and by connecting the other piece, by at least one trolley, to the other run of the belt; and
   c) together in opposite directions, by simultaneously connecting one piece via at least one trolley to one run of belt and by connecting the other piece via at least one trolley, to the other run of belt.

* * * * *